United States Patent
Panesar et al.

(10) Patent No.: US 10,133,674 B2
(45) Date of Patent: *Nov. 20, 2018

(54) SYSTEM AND METHOD FOR ONE STEP ADDRESS TRANSLATION OF GRAPHICS ADDRESSES IN VIRTUALIZATION

(71) Applicant: INTEL CORPORATION, Santa Clara, CA (US)

(72) Inventors: Kiran S. Panesar, Sunnyvale, CA (US); Michael A. Goldsmith, Lake Oswego, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/711,312

(22) Filed: May 13, 2015

(65) Prior Publication Data

US 2015/0301945 A1 Oct. 22, 2015

Related U.S. Application Data

(63) Continuation of application No. 11/025,126, filed on Dec. 29, 2004, now Pat. No. 9,058,292.

(51) Int. Cl.
*G06F 12/1009* (2016.01)
*G06F 12/10* (2016.01)
(Continued)

(52) U.S. Cl.
CPC .......... *G06F 12/10* (2013.01); *G06F 9/45558* (2013.01); *G06F 12/1009* (2013.01); *G06F 12/109* (2013.01); *G06F 12/1081* (2013.01); *G06F 2009/45579* (2013.01); *G06F 2009/45583* (2013.01); *G06F 2212/1016* (2013.01); *G06F 2212/657* (2013.01)

(58) Field of Classification Search
None
See application file for complete search history.

(56) References Cited

U.S. PATENT DOCUMENTS

| | | | | |
|---|---|---|---|---|
| 4,374,410 A * | 2/1983 | Sakai | ................. | G06F 12/0292 711/206 |
| 4,456,954 A * | 6/1984 | Bullions, III | ............. | G06F 9/44 711/207 |

(Continued)

FOREIGN PATENT DOCUMENTS

| | | |
|---|---|---|
| JP | 57-212680 | 12/1982 |
| JP | S608971 A | 1/1985 |
| JP | 2004110812 A | 4/2004 |

OTHER PUBLICATIONS

Advisory Action from U.S. Appl. No. 11/025,126 dated Aug. 14, 2008, 3 pages.

(Continued)

*Primary Examiner* — Joni Richer
(74) *Attorney, Agent, or Firm* — Nicholson De Vos Webster & Elliott LLP

(57) ABSTRACT

A system and method including, in some embodiments, receiving a request for a graphics memory address for an input/output (I/O) device assigned to a virtual machine in a system that supports virtualization, and installing, in a graphics memory translation table, a physical guest graphics memory address to host physical memory address translation.

10 Claims, 7 Drawing Sheets

(51) Int. Cl.
  *G06F 12/02*     (2006.01)
  *G06F 12/1081*   (2016.01)
  *G06F 9/455*     (2018.01)
  *G06F 12/109*    (2016.01)

(56) References Cited

U.S. PATENT DOCUMENTS

| | | | | |
|---|---|---|---|---|
| 4,816,991 | A * | 3/1989 | Watanabe | G06F 12/1036 |
| | | | | 711/207 |
| 5,577,231 | A * | 11/1996 | Scalzi | G06F 9/45537 |
| | | | | 703/26 |
| 5,933,158 | A | 8/1999 | Santos et al. | |
| 6,073,226 | A * | 6/2000 | Cutshall | G06F 12/1009 |
| | | | | 711/202 |
| 6,112,285 | A * | 8/2000 | Ganapathy | G06F 12/1027 |
| | | | | 711/203 |
| 6,192,455 | B1 | 2/2001 | Bogin et al. | |
| 6,362,826 | B1 | 3/2002 | Doyle et al. | |
| 6,370,633 | B2 | 4/2002 | Sethi | |
| 6,606,697 | B1 | 8/2003 | Kawahara et al. | |
| 6,628,294 | B1 | 9/2003 | Sadowsky et al. | |
| 6,725,289 | B1 * | 4/2004 | Waldspurger | G06F 12/1081 |
| | | | | 710/2 |
| 6,895,491 | B2 | 5/2005 | Kjos et al. | |
| 7,069,413 | B1 * | 6/2006 | Agesen | G06F 12/1036 |
| | | | | 711/207 |
| 7,243,208 | B2 | 7/2007 | Ito et al. | |
| 7,243,209 | B2 | 7/2007 | Ito et al. | |
| 2001/0028355 | A1 | 10/2001 | Porterfield | |
| 2001/0042184 | A1 | 11/2001 | Sethi | |
| 2002/0082824 | A1 | 6/2002 | Neiger et al. | |
| 2003/0200413 | A1 * | 10/2003 | Gurumoorthy | G06F 12/1009 |
| | | | | 711/206 |
| 2004/0064668 | A1 | 4/2004 | Kjos et al. | |
| 2006/0112212 | A1 * | 5/2006 | Hildner | G06F 9/45537 |
| | | | | 711/6 |

OTHER PUBLICATIONS

Advisory Action from U.S. Appl. No. 11/025,126 dated Jun. 22, 2009, 3 pages.
Advisory Action from U.S. Appl. No. 11/025,126 dated May 28, 2014, 4 pages.
Communication pursuant to Article94(3) EPC: Office Action, dated Jun. 11, 2014, European Patent Office, for European Application No. 05856135.8-1953, 6 pgs.
Final Office Action from U.S. Appl. No. 11/025,126 dated Apr. 7, 2009, 15 pages.
Final Office Action from U.S. Appl. No. 11/025,126 dated Feb. 12, 2010, 15 pages.
Final Office Action from U.S. Appl. No. 11/025,126 dated Jun. 3, 2008, 13 pages.
Final Office Action from U.S. Appl. No. 11/025,126 dated Mar. 21, 2014, 17 pages.
Non Final Office Action from U.S. Appl. No. 11/025,126 dated Feb. 1, 2008, 16 pages.
Non Final Office Action from U.S. Appl. No. 11/025,126 dated Oct. 22, 2008, 15 pages.
Non Final Office Action from U.S. Appl. No. 11/025,126 dated Oct. 30, 2014, 22 pages.
Non Final Office Action from U.S. Appl. No. 11/025,126 dated Sep. 4, 2009, 15 pages.
Non Final Office Action from U.S. Appl. No. 11/025,126 dated Sep. 19, 2013, 14 pages.
Notice of Allowance from U.S. Appl. No. 11/025,126 dated Feb. 13, 2015, 5 pages.
Communication Pursuant to Article 94(3) EPC for foreign counterpart for European Application No. 15 020 144.0, dated Dec. 16, 2016, 6 pages.
European Search Report for European Application No. 15020144.0, dated Aug. 2, 2016, 3 pages.
Summons to attend Oral Proceedings for European Application No. 05856135.8, dated Sep. 12, 2017, 18 pages.
Notice of Allowance from foreign counterpart Taiwan Patent Application No. 94147319, dated May 1, 2008, 3 pages.
Office Action from foreign counterpart Taiwan Patent Application No. 94147319, dated Mar. 4, 2008, 3 pages.
Office Action from foreign counterpart European Patent Application No. 1839158, dated Feb. 18, 2009, 5 pages.
Office Action from foreign counterpart European Patent Application No. 1839158, dated Jun. 11, 2014, 6 pages.
Notice of Allowance from foreign counterpart Chinese Patent Application No. 200580044864.2, dated Jan. 29, 2010, 5 pages
Notice of Grant from foreign counterpart Chinese Patent Application No. 200580044864.2, dated Jun. 9, 2010, 15 pages.
First Office Action from foreign counterpart Chinese Patent Application No. 200580044864.2, dated Jul. 18, 2008, 10 pages.
Second Office Action from foreign counterpart Chinese Patent Application No. 200580044864.2, dated Apr. 3, 2009, 10 pages.
Third Office Action from foreign counterpart Chinese Patent Application No. 200580044864.2, dated Jul. 17, 2009, 9 pages.
Notice of Grant from foreign counterpart Japanese Patent Application No. 2007-549696, dated May 8, 2012, 4 pages.
Notice of Reasons for Rejection from foreign counterpart Japanese Patent Application No. 2007-549696, dated May 11, 2010, 4 pages.
Notice of Reasons for Rejection from foreign counterpart Japanese Patent Application No. 2007-549696, dated Jul. 12, 2011, 4 pages.
Hideyuki Hayashi, "High-Performance Virtual Computation Systems Currently in Use," Nikkei Computer, vol. 74, Nikkei-McGraw Hill Publishing, Jul. 23, 1984, pp. 63-82 (International Technical Journal 2007-00526-001), month unknown.
Notice of Final Rejection from foreign counterpart Korean Patent Application No. 2007-7014875, dated Oct. 20, 2008, 2 pages.
Notice of Final Rejection from foreign counterpart Korean Patent Application No. 2007-7014875, dated Mar. 14, 2008, 2 pages.
Notice of Final Rejection from foreign counterpart Korean Patent Application No. 2008-7030928, dated Sep. 29, 2009, 2 pages.
Notice of Allowance from foreign counterpart Korean Patent Application No. 2008-7030928, dated Jan. 20, 2010, 1 page.
Notice of Preliminary Rejection from foreign counterpart Korean Patent Application No. 2008-7030928, dated Mar. 6, 2009, 2 pages.
Notice of Grant from foreign counterpart China Patent Application No. 201010167112.8, dated Jul. 24, 2012, 4 pages.
Third Office Action from foreign counterpart China Patent Application No. 201010167112.8, dated Mar. 12, 2012, 10 pages.
First Office Action from foreign counterpart China Patent Application No. 201010167112.8, dated May 18, 2011, 10 pages.
Second Office Action from foreign counterpart China Patent Application No. 201010167112.8, dated Nov. 25, 2011, 9 pages.
Transmittal of International Search Report on Patentability and Written Opinion of the International Searching Authority from foreign counterpart PCT/US2006/047683 dated Jul. 3, 2007, 8 pages.
Transmittal of International Search Report on Patentability and Written Opinion of the International Searching Authority from foreign counterpart PCT/US2006/047683 dated Jun. 12, 2006, 11 pages.

\* cited by examiner

SYSTEM AND METHOD FOR ONE STEP ADDRESS TRANSLATION OF GRAPHICS ADDRESSES IN VIRTUALIZATION

CROSS REFERENCE TO RELATED APPLICATIONS

This application is a continuation patent application of U.S. application Ser. No. 11/025,126, filed Dec. 29, 2004, entitled, "System And Method For One Step Address Translation Of Graphics Addresses In Virtualization", now U.S. Issued U.S. Pat. No. 9,058,292, Issued on Jun. 16, 2015.

BACKGROUND

A graphics device may require a contiguous memory range to store graphics data. The graphics data may include, for example, three-dimensional data and instructions used by, for example, a graphics subsystem in a personal computer. The contiguous graphics memory may be correlated to a physical memory using a graphics translation table. However, the physical memory may not be contiguous.

Virtualization, in some aspects, is a technique to operate one or more guest operating systems (OS) on the same host hardware by presenting multiple copies of a host hardware-software interface to each guest OS. In a system that supports virtualization, a memory address for the guest may be correlated to host physical memory address. The physical host memory may back up the physical guest memory.

Furthermore, in a system having a graphics device and supporting virtualization, it may be necessary to provide two memory address translations. One translation to map a graphics address to a physical guest address and a second translation to translate the physical guest address to a physical host address.

Thus, there exists a need in the technology to provide a system and method to efficiently translate graphics addresses in a context that supports virtualization.

DETAILED DESCRIPTION

Figure 1:
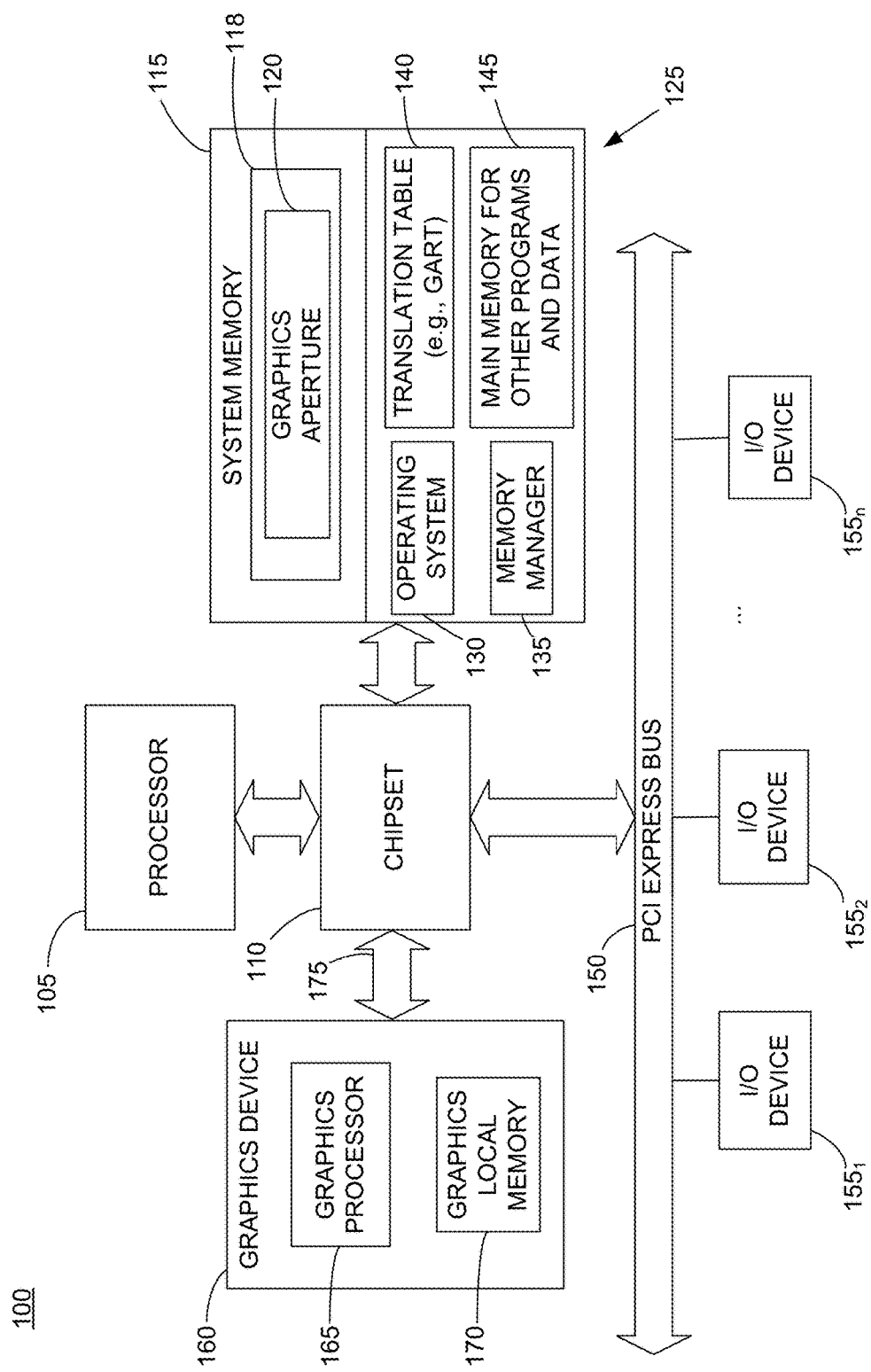
FIG. 1 is block diagram of a computer system, according to some embodiments hereof.

FIG. 1 is an exemplary block diagram illustrating physical hardware of a computer system that may be used in some embodiments hereof, generally represented by reference number 100. Computer system 100 includes a processor 105. Processor 105 represents a central processing unit of any type of architecture. Some embodiments hereof may be implemented by computer systems having multiple processors. Computer system 100 includes a chipset 110 that has a number of control circuits and a number of interface circuits to allow processor 105 to access a system memory 115, a system bus 150 (e.g., a Peripheral Component Interconnect (PCI) Express bus), and a graphics device 160.

A number of peripheral component interconnect (PCI Express) devices $155_1$ through $155_n$ are connected to Express bus 150, as defined by the PCI Special Interest Group (PCI-SIG) in "PCI Express Base Specification, Version 1.0" (July 2002). PCI Express devices $155_1$ through $155_n$ are input/output (I/O) hardware devices such as, for example, a disk controller/card, a local area network controller/card, etc.

In some embodiments, chipset 110 may have one or more bus controllers (e.g., PCI Express bus), a graphics controller, a CPU controller, and a memory controller to control data access between various components such as, for example, bus 150, graphics device 160, system memory 115, processor 105, etc.

It should be appreciated that computer system 100 may include other, additional, or fewer components than those illustrated in FIG. 1, without departing or altering the scope of the various embodiments herein.

System memory 115 represents one or more mechanisms for storing information. For example, system memory 115 may include non-volatile or volatile memories. In some embodiments, system memory 115 includes a graphics memory unit 118, a graphics aperture 120 and a main memory 125. Main memory 125 may include an operating system (OS) 130, a memory manager 135, a graphics memory translation table 140, and additional main memory 145 allocated for other information such as, for example, other programs and data.

Graphics device 160 may be an add-in device or integrated into computer system 100. In some embodiments, graphics device 160 includes a graphics processor 165 and a graphics local memory 170. The memory may be random access memory (RAM) (e.g., extended data out dynamic random access memory (EDO), synchronous graphic random access memory (SGRAM), video random access memory (VRAM)). The memory is included, since the video card must be able to remember a complete screen image at any time, and maintain local copies of graphics programs, and graphics objects like triangles, and textures. It is noted that some embodiments herein are also applicable to graphics devices and I/O devices having no local memory.

Graphics processor 160 performs graphics functions, such as, 3-D rendering operations, drawings, etc. Graphics processor 165 has access to its own graphics local memory 160. Graphics device 160 may be coupled to chipset 110 via accelerated graphics port (AGP) 175. AGP 175 provides a high-speed bus for moving data directly from system memory 115 to graphics device 160. Direct references may be made to system memory 115. Due to the direct references to system memory 115, a contiguous view of system memory 115 may be essential for efficient transfer of information between graphics device 160 and system memory 115.

In some embodiments, graphics device 160 may be coupled to chipset via PCI express bus 150.

In some embodiments, a range of system memory 115 is reserved for graphics memory unit 118 including graphics aperture 120. Graphics aperture 120 provides a range of memory addresses used by AGP 175 for graphics information such as, for example, 3-D features and textures. However, since system memory 115 is dynamically allocated for graphics data, it is necessary to provide a graphics mapping table mechanism to map random segments of system memory 115 into a single contiguous, physical space for graphics aperture 120.

A graphics memory translation table such as a Graphics Address Re-Mapping Table (GART) or a Graphics Translation Table (GTT) may be used to provide a physically-contiguous view of scattered pages in system memory for direct memory access (DMA) transfers. With AGP 175, main memory is specifically used for advanced three-dimensional features, such as textures, alpha buffers, and ZBuffers. As mentioned above, since the AGP generates direct references into system memory, a contiguous view of that space is essential. However, since system memory is dynamically allocated in, for example, random 4K pages, it may be necessary to provide an address mapping mechanism that maps random 4K pages into a single contiguous, physical address space.

Figure 2:
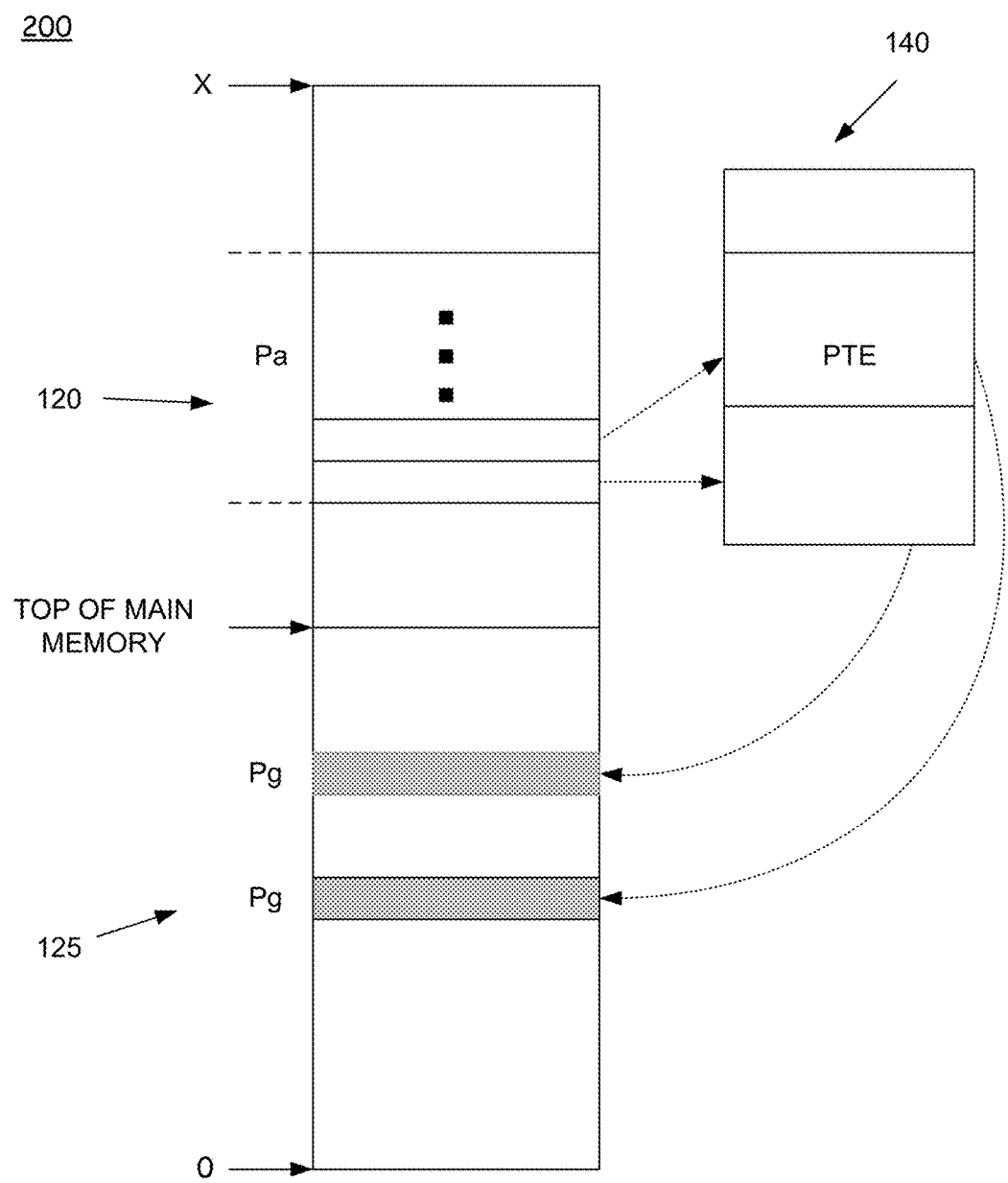
FIG. 2 is an exemplary depiction of a graphics translation table, according to some embodiments herein.

FIG. 2 illustrates an exemplary graphics memory translation table map, generally represented by reference number 200. In some embodiments, system memory 115 includes a main memory 125 having an address range from address zero (0) to a top thereof. Graphics aperture 120 may have an address range that begins from the top of main memory 125. Graphics aperture 120 is a virtual memory and maps into the physical address space of main memory 125.

Graphics aperture 120 is a portion of system memory 115 that is allocated by operating system 130 for use by graphics device 160. Graphics device 160 is provided access to the reserved graphics aperture 120 to store texture data, front buffer data or other graphics data for faster graphics data processing. Each address Pa in graphics aperture 120 has a corresponding entry mapped into a physical address space Pg of main memory 125.

Operating system 130 allocates pages in main memory 125 (of system memory 115) wherever they are found and assigns them for graphics device 160. Graphics device 160 is therefore provided with a continuous block of graphics aperture 120, wherein references pointing from a graphics aperture 120 address Pa to a corresponding address Pg in main memory 125 are stored in graphics memory translation table 140 as a page table entry (PTE).

Virtualization, in some aspects, is a technique to operate one or more guest operating systems (OS) on the same native hardware by presenting multiple copies of a host hardware-software interface to each guest OS. The native hardware may be referred to as the host. The multiple guest OSs may even run concurrently. In a virtualization context, managing memory used by a graphics device or subsystem is further complicated because of a need to translate guest memory addresses to physical host addresses due to the virtualization of the host hardware.

Figure 3:
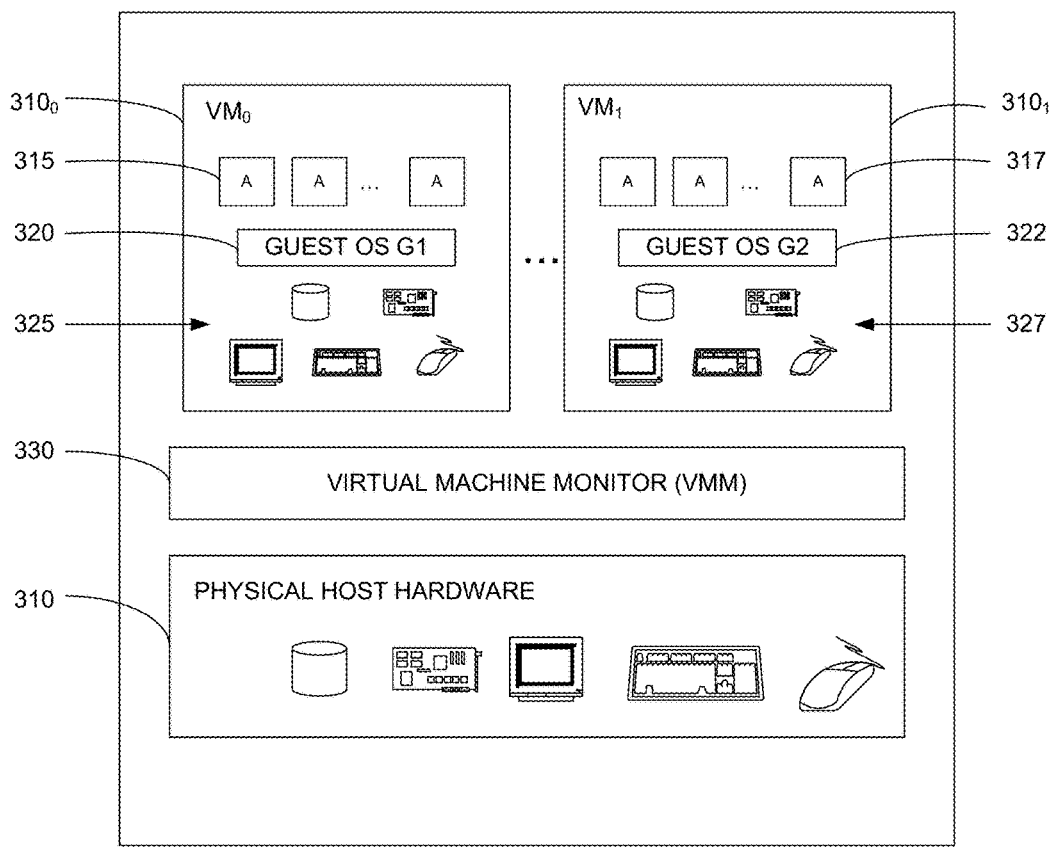
FIG. 3 is an exemplary depiction of a virtual machine, according to some embodiments herein.

FIG. 3 illustrates an exemplary system 300 that supports virtualization. System 300 includes physical host hardware 305, a number of guest virtual machines $VM_0$ $310_0$ and $VM_1$ $310_1$, and a virtual machine monitor (VMM) 330. Each of $VM_0$ $310_0$ and $VM_1$ $310_1$ may be referred to as a guest herein relative to physical host hardware 305. In some embodiments, physical host hardware 305 may include a computer system and/or components thereof similar to system 100 illustrated in FIG. 1. Physical host hardware 305 may also be referred to herein as the host.

It should be appreciated that the particular physical host hardware included in host 305 may be varied, much as system 100 may be altered as stated in conjunction with the discussion of FIG. 1, without departing from and/or altering the scope of the various embodiments herein.

In some embodiments, physical host hardware 305 may include a processor, a memory, various I/O devices (e.g., keyboard, monitor, USB controller, network controller etc.), and a graphics device.

Two virtual machines $VM_0$ $310_0$ and $VM_1$ $310_1$ are shown in system 300. It should be appreciated that more or fewer virtual machines may be included or supported in system 300. $VM_0$ $310_0$ and $VM_1$ $310_1$ are depicted as including similar components. For example, $VM_0$ $310_0$ has a number of addresses 315, a guest OS G1 320, and components 325 associated therewith. In a similar manner, $VM_1$ $310_1$ has a number of addresses 317, a guest OS G2 322, and virtual components 327. It should be appreciated by those in the art that differences in functionality may exist between the virtual machine(s) supported by system 300.

In some embodiments, VMM 330 provides a hardware-software interface to each of $VM_0$ $310_0$ and $VM_1$ $310_1$. Each instance of the hardware-software interface may provide an efficient replica of host 305, including the processing, memory, instructions, and other resources thereof (e.g., memory and I/O devices) to the virtual machines connected to or supported by system 300. In some embodiments, guest OS G1 320 and guest OS G2 322 may operate concurrently, in part due to each guest OS operating in its own virtual machine.

In a system that supports virtualization, a guest memory address needs to be translated or mapped to a host physical address since the physical guest memory address (Pg) is a virtual memory address that is actually located at a physical host address (Ph). That is, since the guest's resources, including memory, are virtualizations of hardware or the entire hardware environment of the host, a correlation must be established to associate guest memory addresses (Pg) to physical host addresses (Ph).

Thus, in a virtualized system or a system that supports virtualization, it may be necessary to translate a graphics address of a virtual, guest machine to an actual physical host address location. In accordance with some embodiments herein, there is provided a method and a system to efficiently translate graphics addresses in a context that supports virtualization.

Figure 4:
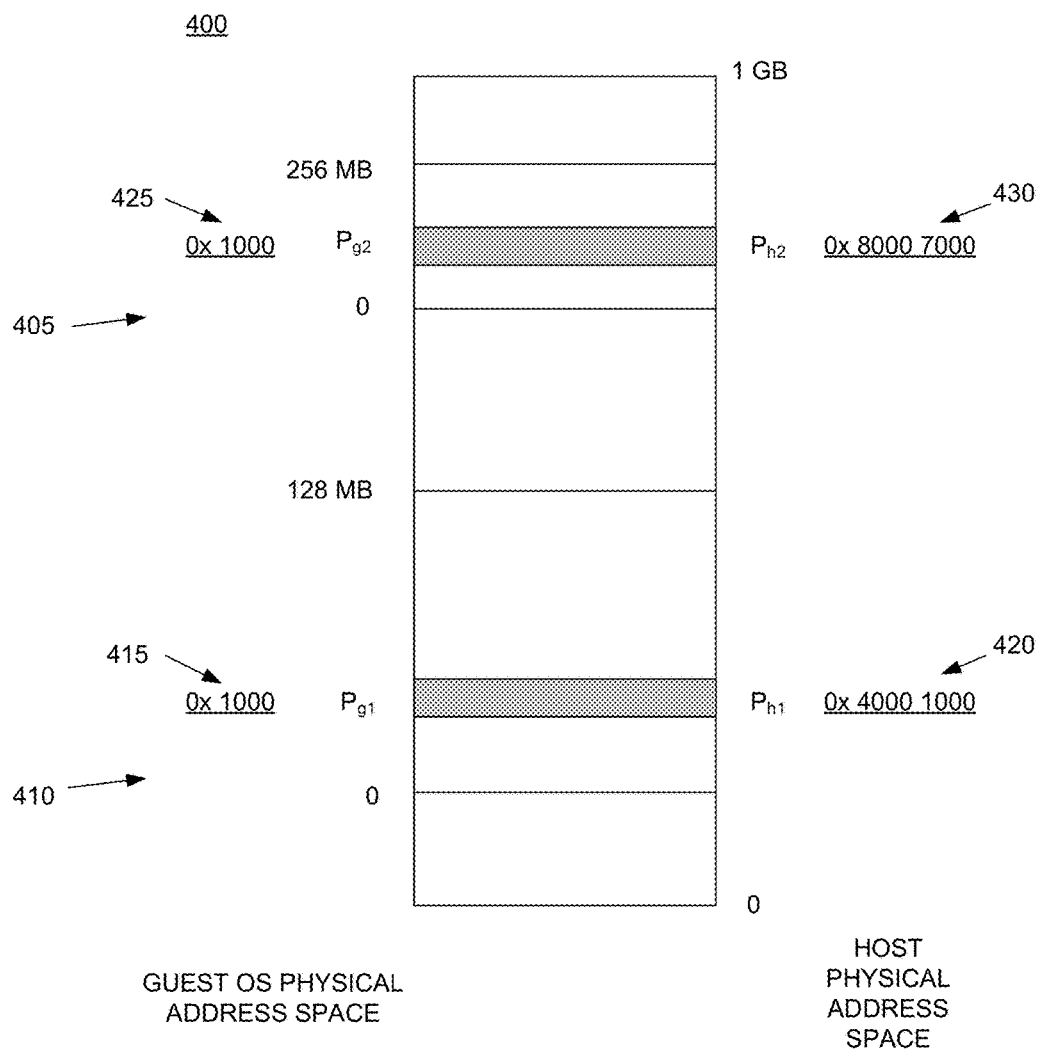
FIG. 4 is an exemplary depiction of physical memory mapping on a virtualized machine, in accordance with some embodiments herein.

In a computing system that supports virtualization, a guest memory address, Pg, may be backed up by (i.e, located at) a physical host address Ph. FIG. 4 is an illustration showing guest OS memory mapped to host memory in a system that supports virtualization. As illustrated, guest G1 address space 410 is 128 MB and guest G1 address space 405 is 256 MB. Physical memory address space for guest OS G1 ($P_{g1}$) and guest OS G2 ($P_{g2}$) are shown mapped to host physical address space ($P_{h1}$) and ($P_{h2}$), respectively. For example, guest memory address 415 is mapped to host address 420, and guest address 425 is mapped to 430.

It should be appreciated that the address locations and sizes shown in FIG. 4 are provided as examples, not necessarily actual memory addresses. Furthermore, the exemplary memory illustrated in FIG. 4 do not represent or imply any limitations to the present disclosure.

It should be appreciated that while various embodiments and aspects of the present disclosure are discussed in the context of a graphics device assigned to a virtual machine and associating a memory address thereof with a physical host address, various aspects and embodiments of the present disclosure may encompass other types of devices. That is, various aspects and embodiments herein may include devices, systems, and subsystems other than a graphics device. For example, an I/O device having a local processor and local memory and forming part of a virtual machine or system that supports virtualization may also benefit from the systems and methods of the present disclosure. As an example, a memory address for a virtual machine I/O device having a processor and a local memory, similar to but not necessarily a graphics device or graphics subsystem, may be used with and/or include aspects of the present disclosure.

Figure 5:
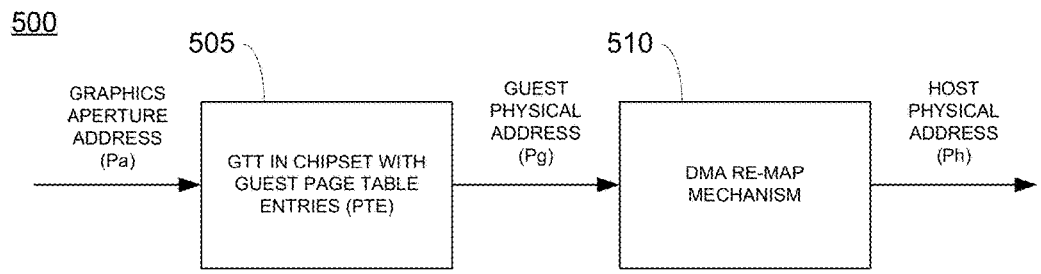
FIG. 5 is a flow diagram of a memory translation including two translations.

FIG. 5 provides an illustrative depiction of a two-step translation process 500 used to map a graphics aperture address (Pa) of a graphics device to a physical guest address (Pg) that is backed up by an actual physical host memory address (Ph) located in main memory of a host system. For example, graphics aperture address (Pa) is translated to a guest physical address (Pg) by chipset 110. Chipset 110 uses a graphics memory translation table mechanism such as a GTT and page table entries (PTEs) to map the graphics aperture address (Pa) to the physical guest address (Pg). However, the guest physical address (Pg) must still be associated with a host physical address (Ph) since the host physical hardware is where the actual physical memory locations exist. A DMA remap mechanism of operation 510 provides the translation from the physical guest address (Pg) to the physical host address (Ph). DMA re-map mechanism 510 may be implemented in hardware or software.

Figure 6:
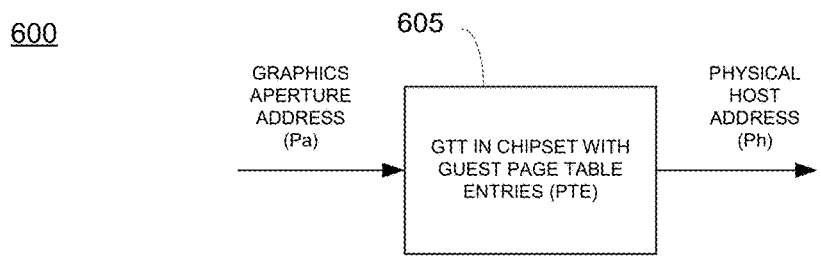
FIG. 6 is an exemplary memory translation scheme including one translation operation, according to some embodiments herein.

In accordance with some embodiments herein, FIG. 6 provides an exemplary illustration of a process 605 to map a graphics memory (e.g., aperture) address (Pa) of a guest, virtual machine to a physical host address (Ph) in a single process or operation. Per operation 605, a graphics translation table is provided that may use PTEs for mapping a guest graphics memory address (Pa) to physical host address (Ph).

In some embodiments, the graphics memory translation table may be a GART or a GTT. Furthermore, the graphics memory translation table may be implemented in a chipset, such as, for example, chipset 110 shown in FIG. 1.

Figure 7:
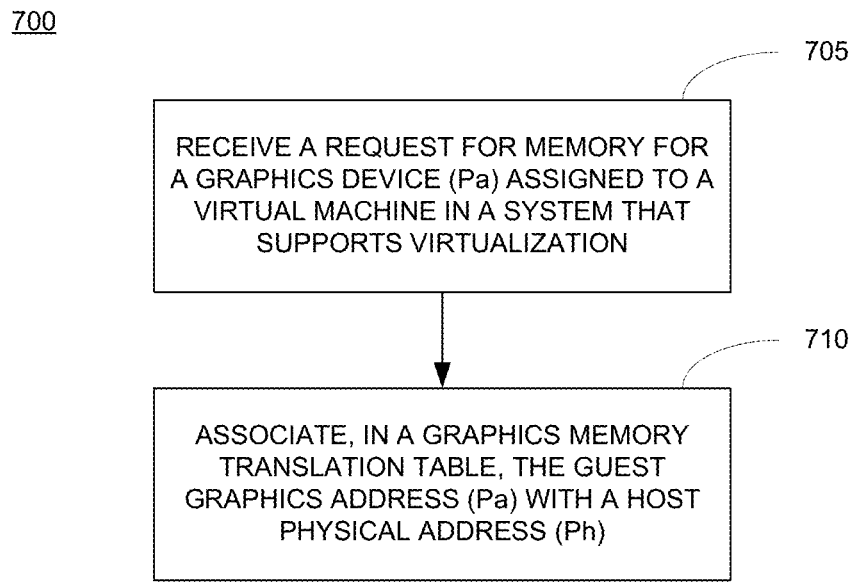
FIG. 7 is an exemplary flow diagram of a process, according to some embodiments herein.
Figure 8:
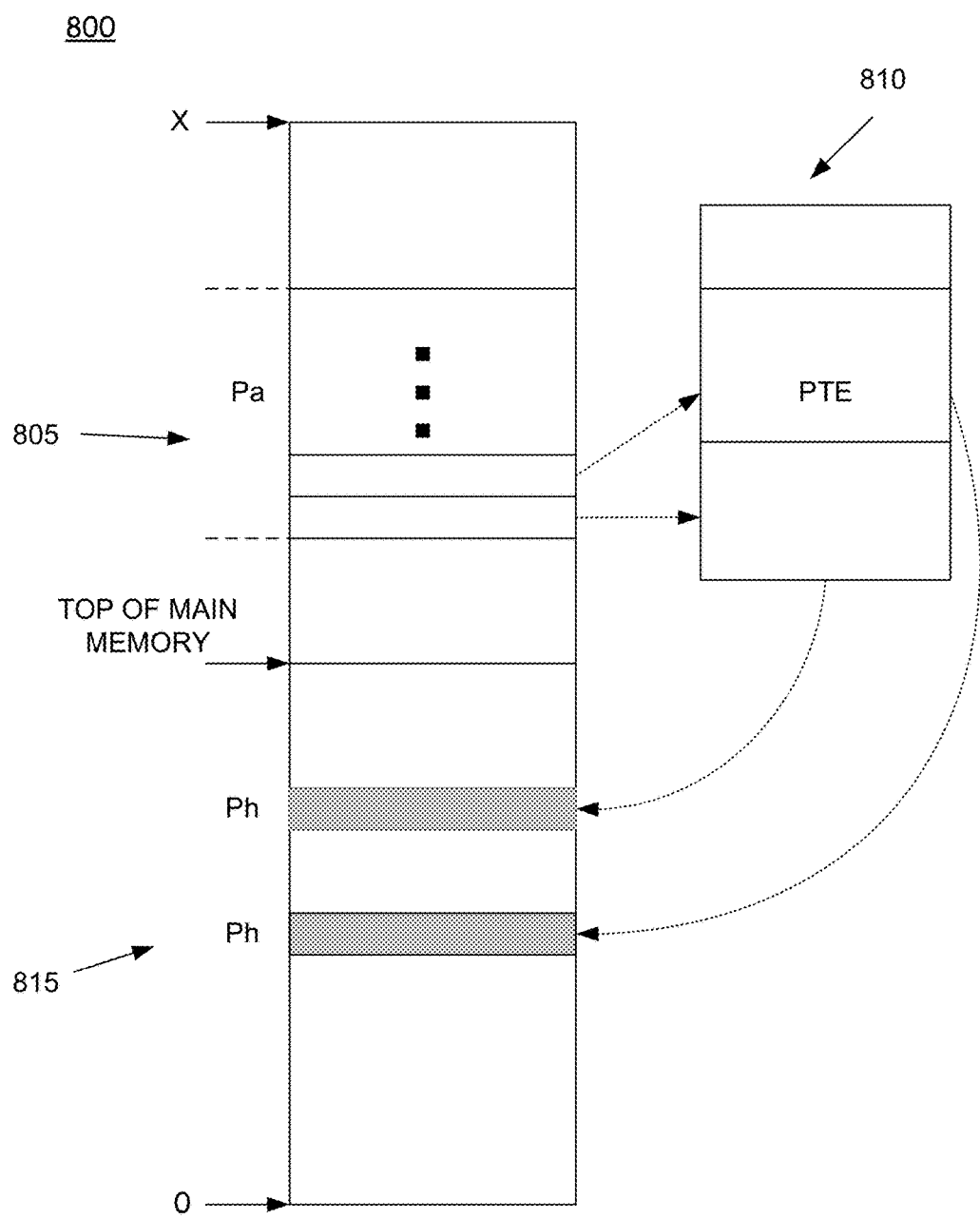
FIG. 8 is an exemplary depiction of a logical memory map illustrating a guest graphics memory address to host physical address translation, in accordance with some embodiments herein.

FIG. 7 is an exemplary flow diagram of a process 700, according to some embodiments herein. FIG. 8 may be referenced in conjunction with FIG. 7 for a better understanding of FIG. 7 and the discussion thereof. FIG. 8 is an exemplary depiction of a logical memory map, generally represented by reference number 800, illustrating a guest graphics memory address (Pa) to host physical address (Ph) translation, facilitated by a PTE to a graphics memory translation table 810. The graphics memory translation table 810 (e.g., a GTT) is used to facilitate a translation or mapping of guest graphics memory address (Pa) 805 to host physical address (Ph) 815. The translation may be facilitated by DMA remapping.

At operation 705, in a system that supports virtualization, a request for memory is made for a graphics device (or other I/O device) assigned to a virtual machine (i.e., guest).

At operation 710, a mapping or translation of the guest graphics memory address (Pa) to the host physical address (Ph) is provided. The host physical address Ph is an actual address location of physical memory in system memory of the physical host hardware 410. The guest graphics memory address (Pa) may be mapped to the host physical address (Ph) in GTT 810 using a DMA remapping technique. The graphics device, and more generally an I/O device including a processor and local memory that is assigned or supported by virtualization, uses host physical addresses (815) to DMA data from main memory 125 of physical host hardware 330.

In some embodiments herein, the process of using a graphics memory translation table 810 to map a guest graphics memory address (Pa) to a host physical address (Ph) may be implemented in software. In some embodiments herein, the process of using graphics memory translation table 810 to map the guest graphics memory address (Pa) to the host physical address (Ph) may be implemented in hardware. The hardware mechanism may use page table translation logic in chipset hardware.

Regarding some embodiments including a software implementation of the process of using a graphics memory translation table 810 to map a guest graphics memory address (Pa) to a host physical address (Ph), a guest OS driver and a VMM (e.g., 330) cooperate to manage entries to the graphics memory translation table. The guest OS driver provides a physical host address (Ph) directly to the graphics memory translation table. Prior to installing the host physical address (Ph) in the graphics memory translation table, the guest OS driver queries the VMM for a valid physical host address. In response to the query by the guest OS, the VMM provides a valid (e.g., available) host physical address (Ph). That is, the VMM only returns a host physical address that is valid for use by the guest OS. The guest OS driver then installs the valid physical host address (Ph) in the GTT.

In some software implemented embodiments, a guest OS driver and a VMM cooperate to manage entries to the graphics memory translation table in which the guest OS driver is aware of the guest-to-host mapping. Graphics memory translation table 810 may be read-only for the guest OS. Accordingly, the guest OS can only read from GTT 810. In these embodiments, the guest OS driver may attempt to write a guest graphics memory address to the GTT 810. The VMM may provide a service to validate physical host addresses prior to entering the validated physical host addresses (Ph) into the graphics memory translation table. That is, the VMM validates the physical host addresses and enters the validated physical host addresses into the graphics memory translation table. The VMM validation and entry of the physical host addresses into GTT 810 may be provided to offer a level of security to safeguard against a guest OS from accessing a physical host address needed by, for example, another guest OS.

In some software implemented embodiments herein, writes or installs of physical host memory to GTT 810 may be accomplished as part of a batch process. Accordingly, system resource overhead may be amortized.

In some software implemented embodiments herein, the VMM sets up the page tables used in the graphics memory translation table, GTT 810. In these embodiments, the guest OS is unaware of the guest-to-host mapping functionality or process herein. Any writes intended for GTT 810 by a guest OS driver are captured by the VMM (e.g., 330). The VMM translates a guest graphics memory address (Pa) into a corresponding physical host address (Ph) and installs the corresponding host physical address (Ph) in the graphics memory translation table. In these embodiments, it is not necessary to alter, adapt, or modify the guest OS driver to accommodate guest-to-host translations since the OS driver does not translate or make entries to the GTT. Additionally, the guest OS cannot access or monitor the physical host addresses of other VMs.

In some embodiments herein, the functionality of process 700 is implemented in hardware. An address decoder or other hardware devices may be used to detect writes to GTT 810. Upon detection of an attempted write to the GTT by a guest OS driver, the hardware may make a query to determine a valid physical host address and install valid physical host address entries to the GTT. Hereto, as in some of the software implementation embodiments discussed above, the guest OS need not be altered or modified since the functionality of the guest-to-host mapping (i.e., translation) does not depend on the OS driver. As in some software embodiments discussed above, a measure of security is provided since the guest OS driver cannot set-up a GTT to map an entry from other VMM's physical memory (i.e., a guest OSS cannot snoop on the activity of another VM's memory).

Accordingly, a single translation operation may be provided to translate the guest graphics memory address to host physical address. In this manner, the number and frequency of translating needed for an I/O device such as, for example, a graphics device, in a system that supports virtualization may be reduced.

In accordance with the hereinabove disclosure, a graphics memory translation table may be utilized to map a guest graphics aperture address to a host physical address. Accordingly, a need for separate DMA remapping and the associated hardware costs and/or changes to translate a guest address to a host address may be reduced or eliminated. Additionally, hardware and/or software (e.g., a chipset) implementing or including the translation functionality disclosed herein may be, in some embodiments, generalized and used in systems that support virtualization.

In some embodiments herein, the graphics may include at least one chipset address remapping method in addition to the remapping methods disclosed hereinabove. For example, an I/O Memory Management Unit (not shown) may be included.

The several embodiments described herein are solely for the purpose of illustration. The various features described herein need not all be used together, and any one or more of those features may be incorporated in a single embodiment. Therefore, persons in the art will recognize from this description that other embodiments may be practiced with various modifications and alterations.

What is claimed is:

1. An apparatus comprising:
   memory management logic to support guest virtual to system physical address translations for a host on which one or more guests are to be executed in a virtualized guest execution environment;
   the memory management logic comprising page table translation logic implemented in a hardware device to assign a plurality of page table entries (PTEs) to input/output (I/O) devices or graphics devices;
   the PTEs to provide a mapping of guest virtual addresses to be utilized by the guests to system physical addresses to be utilized by the host to access physical locations in a system memory;
   an address decoder to detect a write attempt to the page table translation logic by a guest execution environment; and
   an accelerated graphic port through which at least one guest manages the mapping of the guest virtual addresses to host physical addresses within the PTEs, wherein the mapping includes validating the host physical addresses and entering one or more validated host physical addresses into the PTEs responsive to the detection of the write attempt;
   wherein the memory management logic manages a first mapping between guest virtual addresses to guest physical addresses and a second mapping between the guest physical addresses to host physical addresses, wherein at least some translations performed by the memory management logic are to utilize the first mapping and the second mapping;
   wherein the memory management logic includes a third mapping comprising at least one translation entry having a direct mapping of a guest virtual address to a system physical address;
   wherein the memory management logic comprises an I/O memory management unit (IOMMU) implemented in hardware to manage guest virtual address to host physical address translations for one or more I/O devices;
   wherein the memory management logic is to translate a virtual guest address to a system physical address using the PTEs responsive to a request from the guest execution environment;
   wherein the memory management logic is to set the PTEs or portions thereof to be read-only for one or more guest execution environments; and
   wherein the host comprises a virtual machine monitor (VMM) to manage execution of each of the guest execution environments.

2. The apparatus as in claim 1 wherein at least one guest comprises a guest operating system.

3. The apparatus of claim 1, wherein the hardware device is a chipset of the apparatus.

4. The apparatus of claim 1, wherein the VMM to manage execution of a guest execution environment includes to:
   translate, by the VMM, a guest virtual address from the guest execution environment into a host physical address.

5. The apparatus of claim 1, wherein the VMM to manage execution of a guest execution environment includes to:
   install, by the VMM, an entry including a guest virtual address from the guest execution environment and a host physical address in the plurality of PTEs.

6. A system comprising:
   a system memory to store program code and data;
   a processor communicatively coupled to the system memory, the processor to execute the program code and process the data;
   memory management logic to perform virtual-to-physical address translations for the processor when accessing the system memory, the memory management logic to support guest virtual to system physical address translations for a host on which one or more guests are to be executed in a virtualized guest execution environment;
   the memory management logic comprising page table translation logic implemented in a hardware device to assign a plurality of page table entries (PTEs) to input/output (I/O) devices or graphics devices;
   the PTEs to provide a direct mapping of guest virtual addresses to be utilized by the guests to system physical addresses to be utilized by the host to access physical locations in a system memory;
   an address decoder to detect a write attempt to the page table translation logic by a guest execution environment; and
   an accelerated graphic port through which at least one guest manages the mapping of the guest virtual addresses to host physical addresses within the PTEs, wherein the mapping includes validating the host physical addresses and entering one or more validated host physical addresses into the PTEs responsive to the detection of the write attempt;
   wherein the memory management logic manages a first mapping between guest virtual addresses to guest physical addresses and a second mapping between the guest physical addresses to host physical addresses, wherein at least some translations performed by the memory management logic are to utilize the first mapping and the second mapping;

wherein the memory management logic includes a third mapping comprising at least one translation entry having a direct mapping of a guest virtual address to a system physical address;

wherein the memory management logic comprises an I/O memory management unit (IOMMU) implemented in hardware to manage guest virtual address to host physical address translations for one or more I/O devices;

wherein the memory management logic is to translate a virtual guest address to a system physical address using the PTEs responsive to a request from the guest execution environment wherein the memory management logic is to set the PTEs or portions thereof to be read-only for one or more guest execution environments; and wherein the host comprises a virtual machine monitor (VMM) to manage execution of each of the guest execution environments.

7. The system as in claim 6 wherein at least one guest comprises a guest operating system.

8. The system of claim 6, wherein the hardware device is a chipset of the processor.

9. The system of claim 6, wherein the VMM to manage execution of a guest execution environment includes to:
translate, by the VMM, a guest virtual address from the guest execution environment into a host physical address.

10. The system of claim 6, wherein the VMM to manage execution of a guest execution environment includes to:
install, by the VMM, an entry including a guest virtual address from the guest execution environment and a host physical address in the plurality of PTEs.

\* \* \* \* \*